United States Patent
Shea et al.

(10) Patent No.: US 10,012,341 B2
(45) Date of Patent: Jul. 3, 2018

(54) UNIVERSAL PRECAST BASE SYSTEM

(71) Applicants: Edward Fitzpatrick Shea, Joplin, MO (US); Linda Suzanne Shea, Joplin, MO (US); Dave Vernon Caylor, Joplin, MO (US)

(72) Inventors: Edward Fitzpatrick Shea, Joplin, MO (US); Linda Suzanne Shea, Joplin, MO (US); Dave Vernon Caylor, Joplin, MO (US)

(73) Assignee: Lined Products LLC, Juplin, MO (US)

( * ) Notice: Subject to any disclaimer, the term of this patent is extended or adjusted under 35 U.S.C. 154(b) by 84 days.

(21) Appl. No.: 14/819,948

(22) Filed: Aug. 6, 2015

(65) Prior Publication Data

US 2017/0035200 A1 Feb. 9, 2017

(51) Int. Cl.
| | |
|---|---|
| *F16M 11/00* | (2006.01) |
| *A47B 91/00* | (2006.01) |
| *E02D 27/02* | (2006.01) |
| *E04C 2/00* | (2006.01) |
| *E04C 2/04* | (2006.01) |

(52) U.S. Cl.
CPC ........... *F16M 11/00* (2013.01); *A47B 91/005* (2013.01); *E02D 27/02* (2013.01); *E04C 2/00* (2013.01); *E04C 2/04* (2013.01); *E04C 2/044* (2013.01)

(58) Field of Classification Search
CPC ...... A47B 91/005; F16M 11/00; E02D 27/02; E04C 2/04; E04C 2/044
USPC ........... 248/679, 678; 52/588.1, 589.1, 592.5
See application file for complete search history.

(56) References Cited

U.S. PATENT DOCUMENTS

| | | | | |
|---|---|---|---|---|
| 460,177 | A * | 9/1891 | Cook ...................... | E04F 15/02 52/286 |
| 948,752 | A * | 2/1910 | Wightman .............. | E04F 13/12 52/314 |
| 1,365,162 | A * | 1/1921 | Ferguson ................. | E04B 2/14 405/273 |
| 2,452,463 | A * | 10/1948 | Herbert .................... | E04B 2/30 52/436 |
| 2,840,430 | A * | 6/1958 | Winer ...................... | E04C 2/36 52/793.1 |
| 2,881,614 | A * | 4/1959 | Preininger ............... | E04B 2/18 52/284 |
| 3,238,682 | A * | 3/1966 | Tracy ...................... | E04F 15/08 404/18 |
| 3,256,657 | A * | 6/1966 | Phipps ..................... | E04B 2/16 52/223.7 |
| 4,075,808 | A * | 2/1978 | Pearlman ................. | E04B 2/54 52/439 |
| 4,173,329 | A * | 11/1979 | Stith, Jr. ................ | B23Q 1/0054 254/93 R |
| 4,243,197 | A * | 1/1981 | Wright .................. | D06F 39/081 220/DIG. 6 |

(Continued)

*Primary Examiner* — Eret C McNichols
(74) *Attorney, Agent, or Firm* — Mashburn Law Office, LLC; Donna Denise Mashburn Chapman

(57) ABSTRACT

A universal precast base system formed from a plurality of interlocking frames, each frame includes at least two channel elements and at least one side element. A channel extends along the channel elements and is open on each end. The external surface of the side element includes an interlocking edge for mating adjacent frames together. Channels of adjacent frames connect to form a continuous channel for receiving vertical wall panels therein.

15 Claims, 4 Drawing Sheets

(56) References Cited

U.S. PATENT DOCUMENTS

| | | | | |
|---|---|---|---|---|
| 4,324,080 A | * | 4/1982 | Mullins | B28B 11/042 52/309.12 |
| 4,354,655 A | * | 10/1982 | Hengst | F16M 7/00 248/676 |
| 4,425,748 A | * | 1/1984 | De Waele | E04B 2/26 52/436 |
| 4,426,815 A | * | 1/1984 | Brown | A63H 33/088 52/100 |
| 4,475,326 A | * | 10/1984 | Hanson | A63H 33/084 52/286 |
| 4,497,858 A | * | 2/1985 | Dupont | A47L 23/24 404/41 |
| 5,076,534 A | * | 12/1991 | Adam | F24F 13/32 248/678 |
| 5,181,362 A | * | 1/1993 | Benitez | E04B 2/18 52/578 |
| 5,230,194 A | * | 7/1993 | McClure | E04B 2/18 52/591.4 |
| 5,263,668 A | * | 11/1993 | Reiter | A47B 91/00 248/346.01 |
| 5,293,725 A | * | 3/1994 | Matticks | E04B 1/34315 52/126.1 |
| 5,297,770 A | * | 3/1994 | Drexel | F16M 5/00 248/638 |
| 5,367,845 A | * | 11/1994 | Hartling | E02D 27/02 52/293.1 |
| 5,447,000 A | * | 9/1995 | Larsen | E04B 1/34315 52/234 |
| 5,457,926 A | * | 10/1995 | Jensen | E04B 2/18 52/309.4 |
| 5,570,552 A | * | 11/1996 | Nehring | E02D 27/02 249/91 |
| 5,575,128 A | * | 11/1996 | Haener | E04B 2/18 52/100 |
| 5,647,177 A | * | 7/1997 | Hwang | E04B 1/34315 52/265 |
| 5,715,635 A | * | 2/1998 | Sherwood | E04B 2/16 52/286 |
| 5,729,943 A | * | 3/1998 | Cambiuzzi | E04B 2/46 52/438 |
| 5,904,015 A | * | 5/1999 | Chen | E04F 15/02494 52/220.2 |
| 5,992,108 A | * | 11/1999 | Falcey | E04B 5/48 52/126.6 |
| 6,050,539 A | * | 4/2000 | Millen | F24F 13/32 248/678 |
| 6,226,951 B1 | * | 5/2001 | Azar | E04B 2/16 52/421 |
| 6,250,022 B1 | * | 6/2001 | Paz | E04B 1/34321 312/100 |
| 6,253,519 B1 | * | 7/2001 | Daniel | E04B 2/44 52/591.1 |
| 6,694,689 B1 | * | 2/2004 | Scott | E04F 15/02 52/391 |
| 6,735,913 B2 | * | 5/2004 | Sanders | E04C 1/395 256/19 |
| 6,962,028 B2 | * | 11/2005 | Banova | E04B 2/44 52/379 |
| 7,197,855 B2 | * | 4/2007 | Della Pepa | E01C 5/001 52/312 |
| 7,337,589 B2 | * | 3/2008 | Meyer | E04B 2/18 52/286 |
| 7,461,482 B2 | * | 12/2008 | Cerasi | E04F 15/02 52/177 |
| 7,467,502 B1 | * | 12/2008 | Syla | A47B 47/042 220/4.28 |
| 7,581,357 B2 | * | 9/2009 | Richardson | E04B 1/34321 446/105 |
| 8,074,419 B1 | * | 12/2011 | Humphress | E04B 2/46 446/120 |
| 8,136,782 B2 | * | 3/2012 | Rowland | F16M 11/22 248/346.01 |
| 8,156,690 B2 | * | 4/2012 | Higley | E04B 1/12 52/169.5 |
| 8,171,693 B2 | * | 5/2012 | Banova | E04B 2/30 52/379 |
| 8,549,811 B2 | * | 10/2013 | Dyson | E04B 2/48 52/437 |
| 8,640,407 B2 | * | 2/2014 | Alsayed | E04B 2/54 52/220.1 |
| 8,720,130 B2 | * | 5/2014 | Weber | E04B 2/48 52/126.4 |
| 8,726,602 B2 | * | 5/2014 | DeLong | E04F 15/02038 52/403.1 |
| 8,739,490 B2 | * | 6/2014 | Weber | E04B 2/44 52/564 |
| 8,863,464 B2 | * | 10/2014 | Balducci, Jr. | E04B 2/46 52/592.6 |
| 8,984,829 B1 | * | 3/2015 | McIntosh | E04F 15/02044 52/403.1 |
| 9,151,068 B2 | * | 10/2015 | Vogler | E04B 1/34321 |
| 9,206,595 B2 | * | 12/2015 | Rutledge | E04B 1/34315 |
| 9,328,503 B1 | * | 5/2016 | Patino | E04H 1/1205 |
| 9,383,109 B2 | * | 7/2016 | Raboine | E04H 1/1205 |
| 9,404,255 B1 | * | 8/2016 | Castro | E04B 2/54 |
| 9,725,871 B2 | * | 8/2017 | Parsons | E02D 29/0225 |
| 2003/0183741 A1 | * | 10/2003 | Milner | F16M 5/00 248/679 |
| 2004/0250495 A1 | * | 12/2004 | Manthei | E01C 5/06 52/589.1 |
| 2005/0166517 A1 | * | 8/2005 | Manthei | E01C 5/06 52/589.1 |
| 2005/0223672 A1 | * | 10/2005 | Ciccarello | E01C 5/06 52/607 |
| 2006/0150559 A1 | * | 7/2006 | Haener | E04B 2/44 52/606 |
| 2006/0248837 A1 | * | 11/2006 | Appleford | E04C 2/08 52/589.1 |
| 2007/0107364 A1 | * | 5/2007 | Estes | E04B 2/16 52/606 |
| 2009/0019811 A1 | * | 1/2009 | Goldman | E04B 1/3483 52/653.2 |
| 2010/0320360 A1 | * | 12/2010 | McLeod | F16M 5/00 248/678 |
| 2011/0061336 A1 | * | 3/2011 | Thomas | B66C 23/342 52/745.19 |
| 2011/0067331 A1 | * | 3/2011 | Grinsted | E04C 2/205 52/309.4 |
| 2011/0179722 A1 | * | 7/2011 | Schulz | E04H 5/02 52/79.1 |
| 2011/0185670 A1 | * | 8/2011 | Mitchell | E04C 2/38 52/539 |
| 2012/0023851 A1 | * | 2/2012 | Marshall | E02D 27/02 52/426 |
| 2012/0110926 A1 | * | 5/2012 | Phillips | E04H 1/1205 52/79.9 |
| 2013/0025213 A1 | * | 1/2013 | Cetindag | E04B 2/18 52/16 |
| 2013/0167458 A1 | * | 7/2013 | Cerny | E04F 15/02038 52/177 |
| 2015/0090860 A1 | * | 4/2015 | Haidvogl | E02D 27/44 248/679 |
| 2016/0083966 A1 | * | 3/2016 | Tang | E04F 15/02005 52/403.1 |
| 2016/0245528 A1 | * | 8/2016 | Raboine | E04H 1/1205 |
| 2016/0260996 A1 | * | 9/2016 | Trevisan | H01M 8/249 |

* cited by examiner

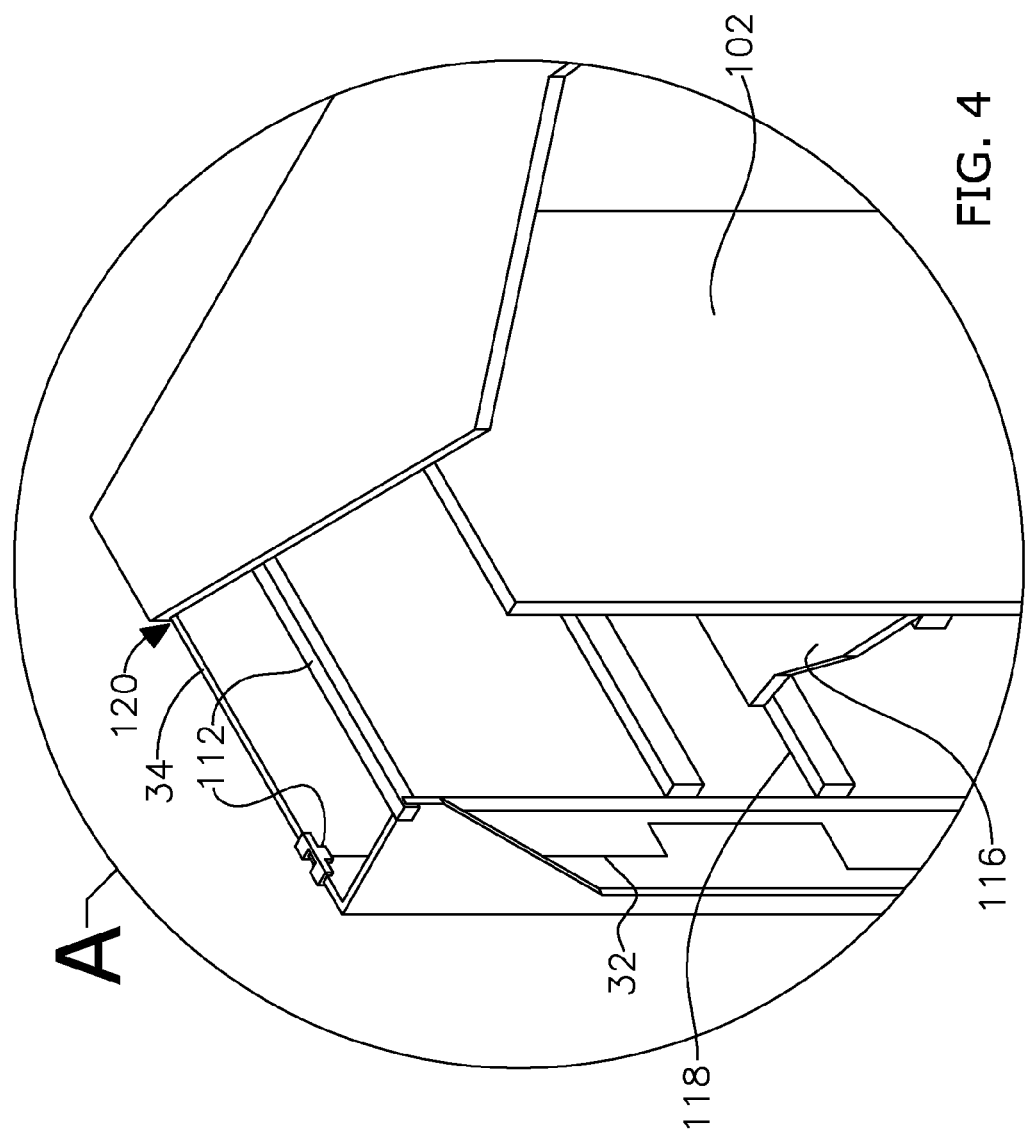

UNIVERSAL PRECAST BASE SYSTEM

FIELD OF INVENTION

Embodiments of the present invention relate generally to the field of precast base systems.

BACKGROUND

A conventional concrete base or foundation system is expensive, difficult, and time-consuming to construct, even for skilled workers, often taking several days to complete. Commonly, up to three or four different manual laborers or contractors are involved to prepare and level the ground surface, construct the concrete molds, mix and deliver the concrete, pour the concrete, and perform various cleanup tasks. Special training, methods, and equipment are often required. In addition, weather-related problems frequently delay the construction of a conventional concrete base or foundation system.

There is a need for an economical precast base system that is relatively lightweight and easy to handle during construction. There is also a need for a precast base system that can be installed in a substantially shorter amount of time by one worker onsite regardless of the weather conditions. A universal precast concrete base system is highly desirable that can be assembled in a variety of different configurations to provide a base for numerous types of structures, e.g., an outdoor kitchen.

It is therefore an object of the present invention to provide a precast base system that is of relatively simple and lightweight construction for ease of delivering, handling, and assembly. No special training is required to assemble the components onsite, which eliminates the expense of contracting several skilled laborers. The present invention can be quickly and economically assembled onsite in a variety of arrangements by one worker in just a few hours and in any type of weather. Decreasing the time for base or foundation system construction leads to significant savings in labor and avoids weather-related delays.

SUMMARY

Embodiments of the present invention include a universal precast base system for supporting outdoor kitchens, columns, benches, fire pits, retaining walls, and the like.

An embodiment of the present invention is a universal precast base system comprising a plurality of precast frames each including at least two channel elements and at least one side element. The channel elements each include a channel and a plurality of notches. The channels connect together to form a continuous channel for receiving vertical wall panels therein. The notches receive interior divider panels therein.

The side element includes an interlocking edge for mating with an interlocking edge of an adjacent frame. The interlocking edge may include bevels or any other suitable interlocking or complementary geometry for aligning adjacent frames together.

The frames may include one or more end frames, middle frames, and corner frames for forming an I-shape, C-shape, U-shape, S-shape, L-shape, or any other suitable shape. The frames may be any size and shape depending on desired use of the precast base system.

BRIEF DESCRIPTION OF THE DRAWING FIGURES

Embodiments of the present invention are described in detail below with reference to the attached drawing figures, wherein:

FIG. 4 is an enlarged cut-away view of the outdoor kitchen of FIG. 3 showing interior divider panels.

Figure 1:
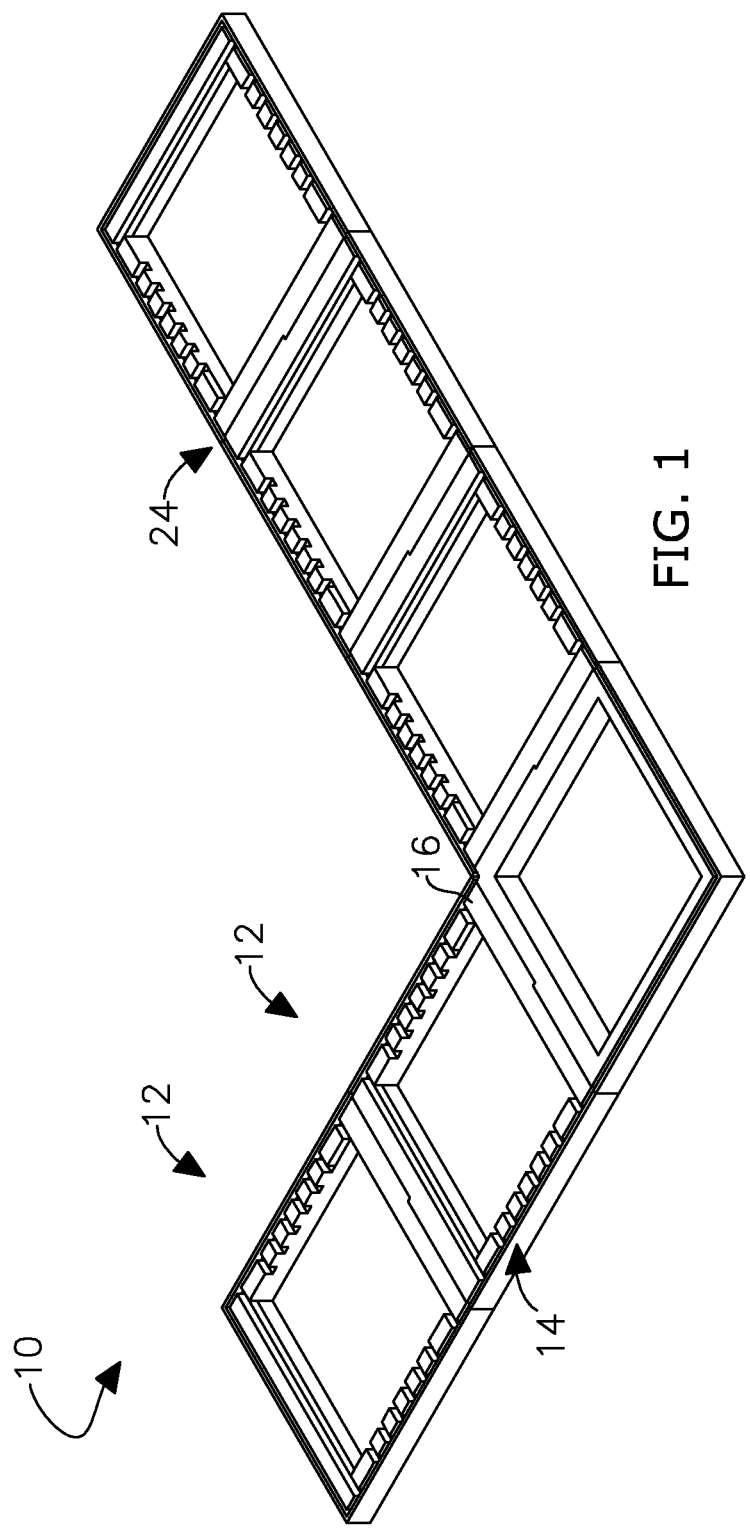
FIG. 1 is a perspective view of a universal precast base system constructed in accordance with an embodiment of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
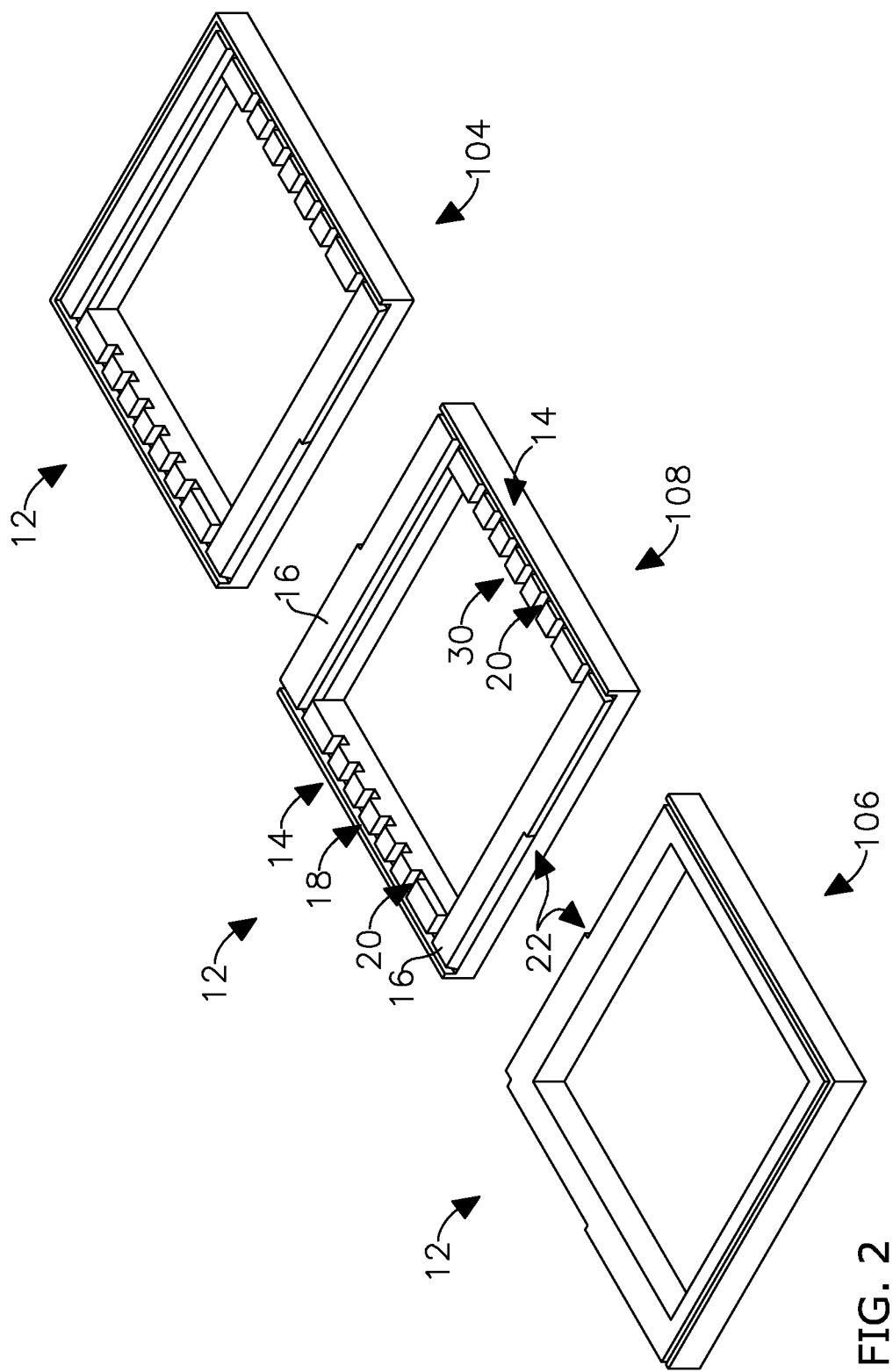
FIG. 2 is a perspective view of end, corner, and middle frames of the universal precast base system of FIG. 1.

Turning to FIGS. 1 and 2, an embodiment of the present invention is a universal precast base system 10 broadly comprising a plurality of frames 12 that may be assembled onsite in a side-to-side abutting relationship. The frames 12 may be formed of any precast cementitious material, e.g., concrete, or other materials such as recycled materials may be used.

Each frame 12 broadly includes a number of channel elements 14 and a number of side elements 16 connected to the channel elements 14. The frames 12 may be any suitable length and width to accommodate various outdoor kitchen or countertop sizes. Thus, the frames 12 may be precast to accommodate construction or design requirements on an "as needed" basis.

Figure 3:
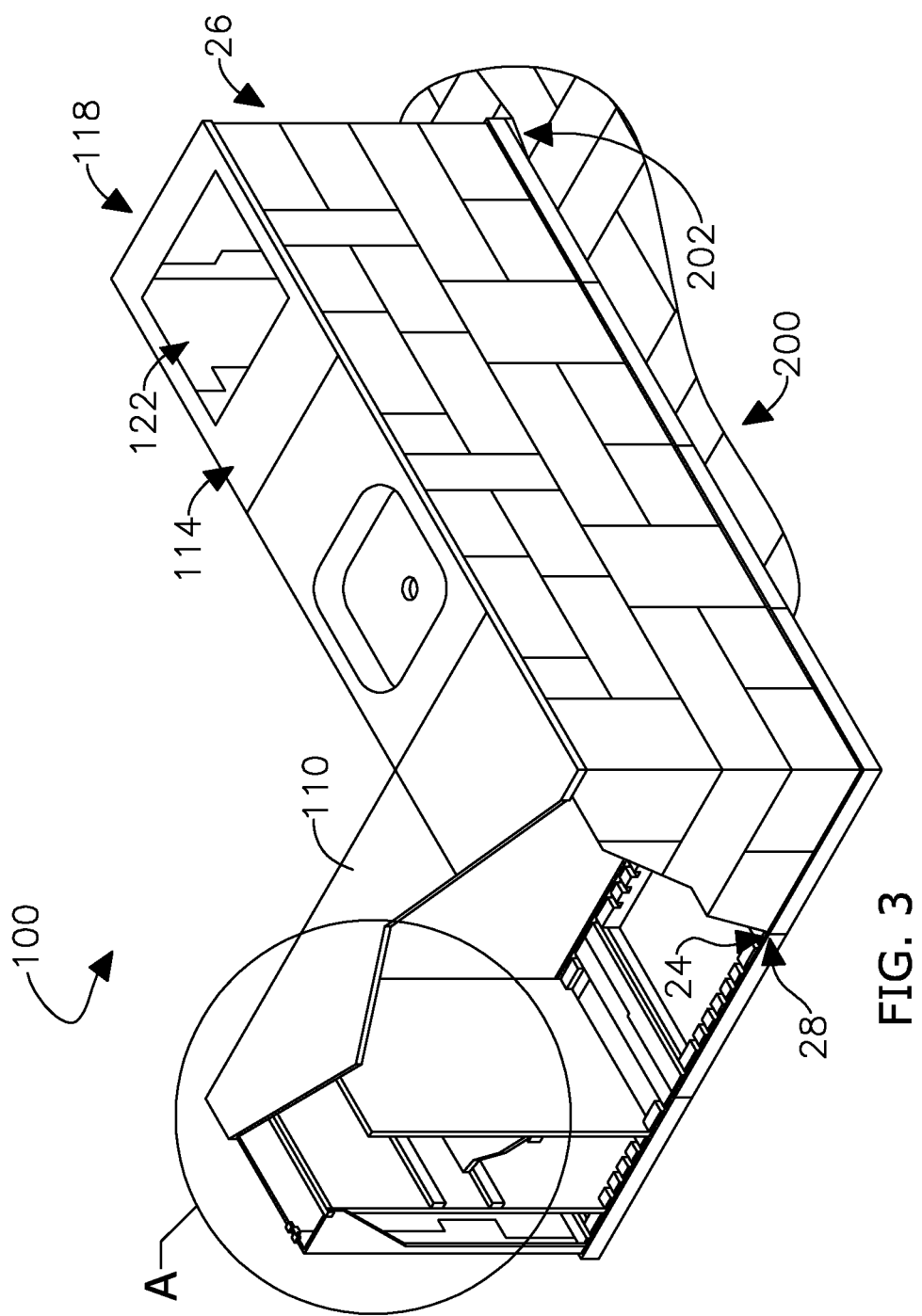
FIG. 3 is a perspective view of an outdoor kitchen constructed in accordance with an embodiment of the present invention and including the universal precast base system of FIG. 1.

The channel elements 14 may include at least one channel 18 and a number of notches 20. The channel 18 extends longitudinally on the upper surface of the channel element 14 and may be open on each end such that adjacent channels 18 of interlocked frames 12 form one continuous channel 24 along the perimeter of the precast base system 10. The continuous channel 24 is configured to receive precast vertical wall panels 26 of varying shapes and dimensions for constructing different structures on the precast base system 10 such as an outdoor kitchen 100, as shown in FIG. 3. The continuous channel 24 aids in the proper placement of precast vertical wall panels 26. The width of each channel 18 (and hence, continuous channel 24) must be sufficient to allow the bottom edge 28 of the precast vertical wall panels 26 to rest snuggly inside the continuous channel 24. The width and depth of the continuous channel 24 may vary to support precast vertical wall panels 26 having different thicknesses and sizes.

The notches 20 receive interior divider panels 102 and may be spaced at intervals along the interior edge 30 of the channel element 14, as shown in FIG. 2. An interior divider panel 102 may be vertically inserted into selected notches 20 of a frame 12 to accommodate various designs or structural requirements.

The side elements 16 include at least one interlocking edge 22. The interlocking edges 22 of adjacent side elements 16 are shaped complimentary to each other for coupling or aligning adjacent frames 12 together during installation. Although additional coupling devices may be used, the interlocking edges 22 eliminate the need for reinforcing rods, bolts, brackets, mortar, or any other coupling device for joining or aligning the individual frames 12 together.

It will be understood that any desired configuration or number of complementary interlocking edges 22 may be utilized on each side element 16 without departing from the scope of the present invention. For example, a single interlocking edge can be located between the medial portions of abutting side elements 16. Each interlocking edge 22 may include any number of shape elements for fitting with a complementary interlocking edge 22.

The number and types of frames 12 used to construct the precast base system 10 varies depending upon the type, design, and size of structure that is built upon the base system 10. Each frame 12 may be an end frame 104, corner frame 106, or middle frame 108, as shown in FIGS. 1 and 2. Frames 12 may be utilized in different combinations to form various shapes such as an I-shape, C-shape, U-shape, S-shape, L-shape (FIGS. 1, 3, and 4), or any other desired shape. For example, an end frame 104 may be installed at each end of the precast base system 10, as best shown in FIG. 1. Each end frame 104 includes three channel elements 14 and one side element 16. The side element 16 of the end frame 104 connects the end frame 104 to an adjacent frame. A corner frame 106 may be used to form the bend in the L-shape. The corner frame 106 includes two channel elements 14 and two side elements 16. Middle frames 108 may be used to add length to the legs of the L-shape. Each middle frame 108 includes two channel elements 14 and two side elements 16.

The frames 12 may be manufactured at a location remote from the building site. Alternatively, molds can be provided at the site for producing the frames. The frames 12 may also be manufactured at a more central location, stacked on conventional wood pallets, and shipped to the site. Since the frames 12 are flat, several frames 12 can be stacked on top of each other.

Construction of the precast base system 10 will now be described in more detail. The present invention can be quickly assembled onsite by one worker on a solid, flat surface 200. For example, the precast base system 10 can be easily assembled directly on the ground, on a concrete slab, a patio built with paver stones or brick, or any other type of firm flat surface.

The frames 12 are laid in place according to the desired base design plan. Opposing side elements 16 of adjacent frames 12 are positioned on the flat surface 200 in side-to-side mating relationship such that the interlocking edges 22 of opposing side elements 16 engage each other to retain the relative position of adjacent frames 12.

It is not necessary that the surface 200 be perfectly level. Small level variations may be finely tuned by inserting a shim 202 beneath the frames 12 as needed, as shown in FIG. 3. This ensures that each frame 12 is installed evenly and the side elements 16 of abutting frames 12 are coupled together properly.

The above-described universal precast base system 10 provides many advantages over the prior art. For example, the universal precast base system 10 is versatile and can be used in various types of construction applications that use precast vertical wall panels 26, e.g., outdoor kitchens 100, columns, benches, fire pits, retaining walls, and the like. The number and types of precast vertical wall panels 26 used to construct these different configurations varies depending on the type, design, and size of the structure. The vertical wall panels 26 may be formed of attractive precast cementitious material, e.g., concrete, or any other castable materials may be used. The precast vertical wall panels 26 may be formed of various shapes and dimensions and may be pre-determined by the design specifications of a particular structure. Custom vertical wall panels may be precast to accommodate construction or design requirements on an "as needed" basis. Furthermore, installing a traditional outdoor kitchen made of brick, rock, or masonry block is time consuming, even for a skilled brick mason, often taking a week or more to complete. Installing precast vertical wall panels 26 on a precast base system 10 is more efficient and eliminates the need for a brick mason on the construction site.

Construction of the L-shaped precast outdoor kitchen 100 will now be described in detail. As illustrated in FIG. 3, the bottom edge 28 of a precast vertical wall panel 26 is positioned snugly into the continuous channel 24 of the frames. The precast vertical wall panel 26 may be free standing from frictionally engaging with the inner surfaces of the channel 18.

Additional precast vertical wall panels 26 are then inserted into the continuous channel 24 of the precast base system 10 and slid into position so that each precast vertical wall panel 26 snugly abuts neighboring precast vertical wall panels 26. The last precast vertical wall panel 26 to be installed must be lowered into place with its side edges sliding along the side edges of the adjacent precast vertical wall panels 26, which are already in place. The installed vertical wall panels 26 form a continuous wall surface around the perimeter of the precast base system 10.

Brackets 112 of various shapes and sizes may be attached along the top edge 34 of precast vertical wall panels 26, as best shown in FIG. 4. The brackets 112 stabilize and provide additional support to the precast outdoor kitchen 100 both during and after construction. For example, brackets 112 can be used to align the top edges 34 of adjacent precast vertical wall panels 26, help maintain the vertical position of an interior divider panel 102, or provide additional support beneath a countertop 114. Brackets 112 may be removed after the precast vertical wall panels 26 are installed. The brackets 112 can be formed from various metals, i.e., aluminum, steel, or from extruded or injection molded plastic, or any other kind of durable material.

Interior divider panels 102 may be installed for partitioning the space inside the outdoor kitchen 100 or to provide additional structural support. Interior divider panels 102 may be inserted into desired notches 20 of the channel elements 14. The interior divider panels 102 may include one or more elongated horizontal ledges 118 for receiving and supporting one or more shelves 116. The shelves 116 provide for the storage of food, utensils and other cooking supplies and may be installed within the kitchen 100 by sliding the shelf 116 along the ledges 118 of two interior divider panels 102 until the back edge of the shelf 116 contacts a precast vertical wall panel 26. Each shelf 116 may be formed of precast cementitious material, e.g., concrete or any other suitable material such as wood or wood products, metal, recycled material, and the like.

The countertop 114 of the precast outdoor kitchen 100 may then be installed. The countertop 114 may include a plurality of precast top panels 110 that are placed on top of the precast vertical wall panels 26 such that the precast vertical wall panels 26 support the precast top panels 110. The undersurface of each precast top panel 110 rests on the top edges of one or more precast vertical wall panels 26. The surface design of the each precast top panel 110 may be determined at the time of casting so as to present an aesthetically desirable surface and edge design.

The precast top panels 110 may be generally planar with smooth side edges 128. Each precast top panel 110 may be formed of precast cementitious material, e.g., concrete or any other suitable material such as metal, recycled material, granite, and the like. When the precast top panels 110 are positioned adjacent to one another, the opposing side edges 128 smoothly abut and align with each other. Although a smooth side edge is shown in FIG. 3, it will be understood that the side edge 128 may be chamfered, beveled, or filleted. For example, in one embodiment, the side edge 128 includes a positive nine degree bevel and a negative nine degree bevel.

The perimeter edges of the precast top panels 110 may have a downward extending lip 120 that overlaps the top edges 34 of the precast vertical wall panels 26. The weight of each precast top panel 110 and the lip 120 stabilizes and maintains the proper alignment of each precast vertical wall panel 26.

Typically, a single worker can quickly construct any number of precast outdoor kitchen 100 configurations on an embodiment of the present invention in just a few hours. Thus, the precast outdoor kitchen 100 is constructed onsite in a manner that requires less time and labor than conventional methods and materials, which has the effect of dramatically reducing the costs associated with building this type of structure.

The ability to form appealing designs on the finished precast base system 10 and outdoor kitchen 100 components is an advantage gained by the use of precasting in general since the finished design work may be accomplished at the time the various components are cast with little or no detail finishing work needed at the construction site. The aesthetic appearance of the precast base system 10, precast vertical wall panels 26, and precast top panels 110 can be enhanced by adding colors, pigments, stains, patterns, designs, textures, or a combination of ornamental treatments to the concrete when cast or incorporated into the base frame molds. Various designs, e.g., brick, tile, faux rock, etc. and different colors to achieve variegated or faux finish effects, i.e., as antiquing or marbleizing, or decorative aggregates can also be used to enhance the appearance of the various components. In order to provide a pleasing finished appearance, the perimeter edges of the precast top panels 110 may include various edge designs, e.g., rounded, feathered, or beveled.

To protect the appearance, the precast base system 10 and outdoor kitchen 100 may be sealed with a solvent or liquid-based material if desired. A scratch coat may also be applied to protect and enhance the decorative appearance of the components of both structures.

Finally, the precast outdoor kitchen 100 is completed by the installation of grills, smokers, sinks, or other appliances or fixtures into apertures 122 provided in the precast wall panels 26 and in the precast top panels 110. The precast outdoor kitchen 100 has great structural integrity and can withstand very high temperatures.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A precast cementitious base system comprising:
    a plurality of interlocking frames each including:
        at least two elongated channel elements each having a channel extending along an upper surface of the elongated channel element;
        at least one elongated side element having at least one interlocking edge for mating with an interlocking edge of an adjacent frame;
        a frame periphery formed by the elongated channel elements connected to the elongated side element defining an aperture inside the frame periphery; and
        at least two notches located along an interior edge of the elongated channel elements for receiving a precast interior divider panel, wherein a first notch is aligned across the aperture with a second notch, and the precast interior divider panel having a bottom edge that vertically inserts into two said notches and extends across the aperture of the frame periphery.

2. The precast cementitious base system of claim 1, wherein said channels form a continuous channel along the perimeter of said precast base system when the frames are positioned adjacent to each other.

3. The precast cementitious base system of claim 2, wherein said continuous channel is configured to receive at least one precast vertical wall panel.

4. The precast cementitious base system of claim 3, further comprising at least one precast vertical wall panel.

5. The precast cementitious base system of claim 1, wherein said frames may be positioned so as to form a U-shaped base system.

6. The precast cementitious base system of claim 1, wherein said frames may be positioned so as to form a L-shaped base system.

7. The precast cementitious base system of claim 1, wherein one of said frames includes three elongated channel elements and one elongated side element so as to form an end frame.

8. The precast cementitious base system of claim 1, wherein said frame includes two elongated channel elements adjacent to each other and two elongated side elements adjacent to each other so as to form a corner frame.

9. The precast cementitious base system of claim 1, wherein at least one of said frame includes two said elongated channel elements opposite from each other and two said elongated side elements opposite from each other so as to form a middle frame.

10. The precast cementitious base system of claim 1, wherein said frames are flat for being stacked and transported on a pallet.

11. The precast cementitious base system of claim 1, further comprising an additional coupling device for joining or aligning the frames.

12. The precast cementitious base system of claim 1, wherein said precast base system is configured to support a precast outdoor kitchen.

13. The precast cementitious base system of claim 1, wherein said precast base system is configured to support a precast bench.

14. The precast cementitious base system of claim 1 wherein said precast base system is configured to support a precast retaining wall.

15. A precast cementitious base system comprising:
   a plurality of interlocking frames including at least one end frame, at least one middle frame, and at least one corner frame, the frames each including:
   at least two elongated channel elements each having a channel extending along an upper surface of the elongated channel element;
   at least two notches located along an interior edge of the elongated channel elements for receiving a precast interior divider panel;
   at least one elongated side element having at least one interlocking edge for mating with an interlocking edge of an adjacent frame; and
   a frame periphery formed by said at least one elongated side element connected to said at least two elongated channel elements defining an aperture inside the frame periphery, wherein a first notch is aligned across the aperture with a second notch, and the precast interior divider panel having a bottom edge that vertically inserts into two said notches and extends across the aperture of the frame periphery.

* * * * *